June 24, 1958 — H. A. LILJENBERG — 2,840,275
SEED AND FERTILIZER SPREADER
Filed Sept. 22, 1955 — 2 Sheets-Sheet 1
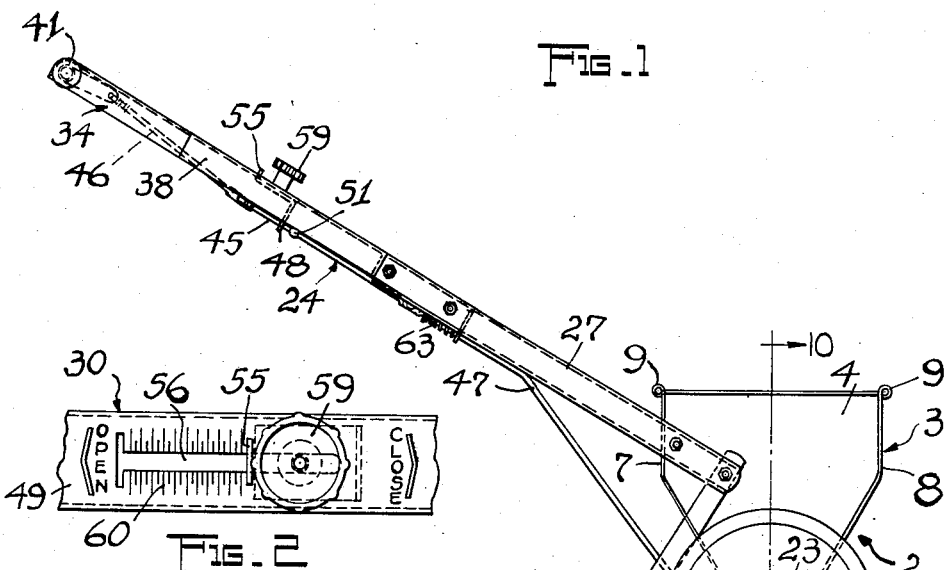
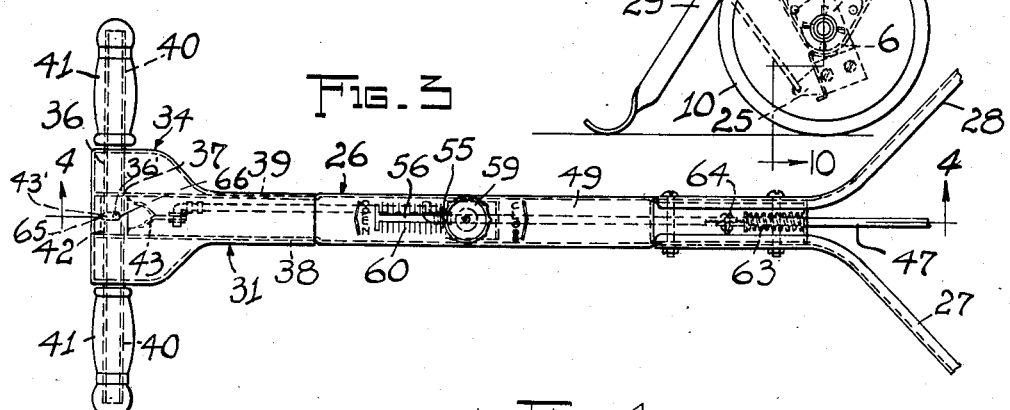
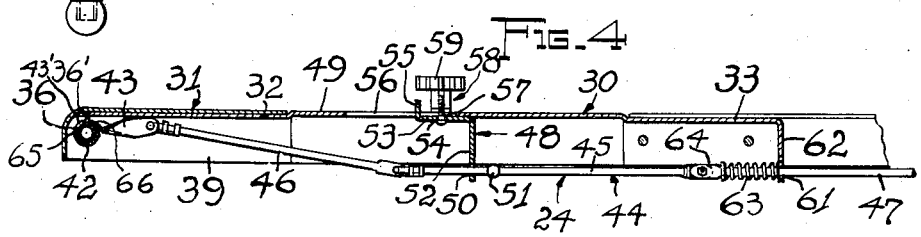
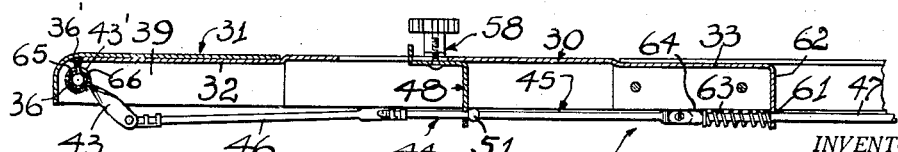
INVENTOR.
HARRY A. LILJENBERG
BY
*Gustav A. Wolff*
ATT.

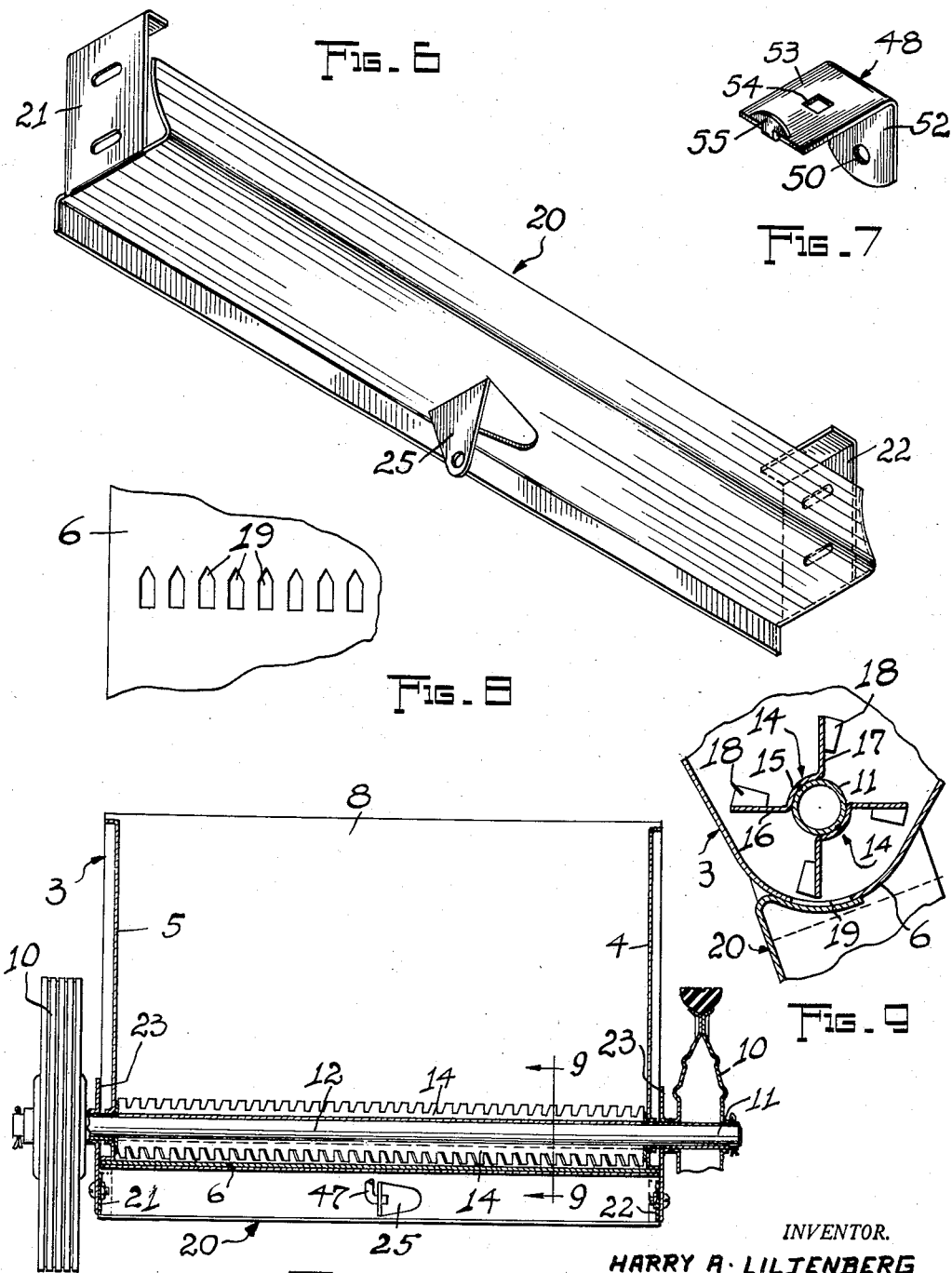

United States Patent Office 2,840,275
Patented June 24, 1958

2,840,275

SEED AND FERTILIZER SPREADER

Harry A. Liljenberg, Cleveland, Ohio, assignor to Modern Tool & Die Company, Cleveland, Ohio, a corporation of Ohio Application September 22, 1955, Serial No. 535,884

4 Claims. (Cl. 222—177)

This invention relates to material spreading apparatus such as seed and fertilizer spreaders constructed to spread predetermined amounts of seed or fertilizer on lawns, gardens, etc., and has particular reference to actuating and adjusting mechanism for hand-operated spreaders.

Conventional spreaders of this type generally discharge material from elongated, preferably agitated hoppers provided in their bottom portions with series of relatively small discharge openings which are controlled by shiftable shutter means and arranged to be adjustably shifted to different positions by shifting mechanism adapted to expose the desired discharge areas of the discharge openings to discharge the desired amounts of material. Hopper discharge openings are rather small so that shifting of shutter means to different positions has to be effected by small movements of shifting mechanism which must properly arrest the shutter means as spreaders generally travel over irregular grounds.

The general object of this invention is the provision of a material spreading apparatus of the type referred to above in which shutter actuating mechanism effects movement of shutter means, the shutter actuating mechanism constructed to yieldingly shift shutter means to any adjusted open position and lock such shutter means in closed position.

Another object of the invention is the provision of material spreading apparatus of the type referred to above with spring-controlled shutter actuating mechanism and adjustable stop means constructed to effect yielding shifting of shutter means toward the stop means and arrest movement of the shutter means by the stop means in any predetermined open position and yieldingly hold the shutter actuating mechanism and shutter means in closed position.

With the above and other objects in view, the invention has certain other marked superiorities which clearly distinguish it from presently known structures and arrangements of this type. These improvements or characteristics, embodying certain novel features of construction and design, are clearly set forth in the appended claims, and the preferred form of embodiment of the invention as used in a hand-operated spreader is hereinafter shown with reference to the accompanying drawings forming part of the specification.

In the drawings:

Fig. 1 is a side view of a hand-operated spreader embodying the invention.

Fig. 2 is an enlarged fragmentary plan view of a center frame portion mounting the adjustable stop member for adjusting the hopper discharge openings of the spreader by its adjusting and actuating mechanism.

Fig. 3 is an enlarged fragmentary plan view of the center frame and side frame.

Fig. 4 is a longitudinal sectional view taken on line 4—4 of Fig. 3, with the adjusting and actuating mechanism in closed position.

Fig. 5 is a sectional view similar to Fig. 4, with the adjusting and actuating mechanism in adjusted open position.

Fig. 6 is a perspective view of the shutter bar.

Fig. 7 is a perspective view of the control bracket.

Fig. 8 is a fragmentary view of the hopper bottom.

Fig. 9 is a sectional view taken on line 9—9 of Fig. 10.

Fig. 10 is a sectional view taken on line 10—10 of Fig. 1.

Referring now in detail to the exemplified form of the invention, the hand-operated seed and fertilizer spreader 2 illustrated in the drawings embodies an open top reservoir hopper 3 having laterally spaced upright end walls 4 and 5, a rounded bottom wall 6, and diverging front and rear walls 7 and 8 reinforced at their top edges by rounded flanges or beads 9. Hopper 3 is supported by carrying wheels 10 mounted on a tubular shaft 11 which is journaled in end walls 4 and 5 on an axis substantially coincident with that of the rounded bottom wall 6 and supports wheels 10 on outwardly extended end portions, with at least one of the wheels coupled to one of the end portions.

Shaft 11 mounts on central portion 12 within hopper 3 a plurality of elongated, substantially V-shaped agitator blades 14 with elongated, curved base portions 15 secured to shaft 11 in symmetrical relation with respect to each other and wing portions 16 and 17 extended radially with respect to shaft 11 and at right angle with respect to each other. Wing portions 16 and 17 are slotted in laterally spaced areas and have such areas partly bent outwardly to form laterally spaced lugs 18 of parallelepipedous shape arranged in rectangular relation to wing portions 16 and 17 and inclined relation to base portions 15.

Hopper 3 includes on the medial line of its bottom wall 6 a series of elongated, at their front ends pointed, laterally spaced discharge openings 19 extended through said hopper from end to end parallel to its end walls 4 and 5, so that rotation of shaft 11 causes lateral moving of material by lugs 18 toward discharge openings 19 and feeding of such material by unbent wing portions 16 and 17 through said discharge openings.

Shaft 11 mounts an elongated shutter bar 20 associated with the outside of rounded bottom wall 6 of hopper 3 and is curved in accordance therewith. This shutter bar is preferably made of sheet metal and includes at its opposite ends ear portions 21, 22 securing the shutter bar to pivot brackets 23 pivotally mounted on shaft 11. Pivoting of the thus supported shutter bar 20 is effected by actuating mechanism 24, later to be described, which is coupled with a perforated lug 25 struck up from shutter bar 20 centrally thereof.

Pushing of spreader 2 over the ground is effected by a handlebar assembly 26 connected to hopper 3 by diverging side bars 27, 28 attached at their opposite ends to handlebar assembly 26 and walls 4 and 5 of hopper 3. These bars are coupled with supporting legs 29 to properly support the spreader when not in use.

Handlebar assembly 26 is shaped from sheet steel and embodies an elongated body portion 30 and a shorter handle portion 31 sleeved upon body portion 30 and secured thereto by welding. Body portion 30 has substantially U-shaped cross section and is reduced at its end portions 32 and 33 to facilitate attaching of side bars 27, 28 to end portion 33 and sleeving of handle portion 31 upon end portion 32. Handle portion 31 has its free end portion enlarged to form a head 34 and rotatably supports in said head an elongated tubular shaft 36 extended through holes 37 in flanges 38, 39 of body portion 30. This tubular shaft mounts on its ends 40 handle members 41 to permit pushing of the spreader. In addition, tubular shaft 36 rotatably supports on its central portion 42 a lever 43 coupled with said shaft by a lost motion coupling connection for individual, limited axial rotation with respect thereto by means of a pin 36' in said shaft, which pin 36' extends through a slot 43' in lever 43 to permit limited individual movements between lever 43 and shaft 36. Lever 43 is coupled with shutter bar 20 and effects closing of discharge openings 19, as will be described hereinafter. To that effect, lever 43 is coupled to lug 25 of shutter bar 20 by an adjustable rod assembly 44 including a central rod 45 linked by link 46 to lever 43 and adjustably connected through an extension rod 47 to lug 25. Central rod 45 is shiftably supported in a control bracket 48 adjustably suspended from web 49 of body portion 30, rod 45 being slidably extended through a hole 50 in control bracket 48 and flattened at 51 to limit axial movements of rod 45. Control bracket 48 is substantially angularly shaped and includes one flange 52 formed with hole 50, a second flange 53 formed with hole 54 and upwardly extended from flange 53 a head portion 55 passing through a T-slot 56 in web 49 when bracket 48 engages with flange 53 the inner face of web 49. Control bracket 48 is secured to web 49 by screw member 57 of screw assembly 58 having screw member 57 passing though hole 54 in flange 53 in web 49. Screw assembly 58 includes a threaded knob 59 which, when released, permits shifting of control bracket 48 on body portion 30 to bring about the desired position of flange 52 of bracket 48 with respect to flat spot 51 of central rod 45, a position ascertainable by scale 60 on body portion 30 cooperating with head portion 55 of control bracket 48.

Extension rod 47 of adjustable rod assembly 44 extends through a hole 61 in end wall 62 of body portion 30 and supports a compression spring 63 sleeved upon extension rod 47 between end wall 62 and connection 64 between central rod 45 and extension rod 47. Compression spring 63 effects shifting of rod assembly 44 and shutter bar 20 to expose discharge openings 19 of hopper 3, which shifting is arrested when flat spot 51 on central rod 45 engages flange 52 of control bracket 48. Shifting of rod assembly 44 is controlled by lever 43 which is linked to central rod 45 by link member 46. Central rod 45 and extension rod 47 are guided so that the coupling point between lever 43 and link member 46 is axially offset with respect to rod assembly 44 when lever 43 is shifted to contact web 49, an arrangement which effects in this predetermined position of lever 43 an off-center locking action for this lever by compression spring 63.

In operation of the spreader, rotation of tubular shaft 36 in one direction while pin 36' engages the end wall 66 of slot 43' effects closing of discharge openings 19, and rotation of tubular shaft 36 in the opposite direction while pin 36' engages the opposite end wall 65 of slot 43' effects release of the off-center locking action of lever 43 and permits opening of the discharge openings 19 by action of compression spring 63. Opening of the discharge openings 19 is limited to the presetting of shutter bar 20 by control bracket 48, shutter bar 20 by spring 63 being yieldingly forced to adjusted position and yieldingly held in open position by said compression spring. Adjustment of the open position of shutter bar 20, effected by adjusting the position of control bracket 48 in T-slot 56, permits use of the spreader to spreading of any desired amount and kind of material through the discharge openings 19.

The described limited axial movement between tubular shaft 36 and lever 43 which is effected by the lost motion coupling connection permits pushing and pulling of the spreader over irregular grounds without possible effect on the previously set open or closed position of discharge openings 19.

Having thus described my invention, what I claim is:

1. In a material spreader, a wheel-supported hopper having discharge openings, shiftable shutter means controlling said discharge openings, a handlebar unit attached to the hopper, spring-actuated shifting means for the shutter means supported by the handlebar unit, operating means for the spring-actuated shifting means mounted on the handlebar unit, and coupling means connecting the spring-actuated shifting means with the operating means, said coupling means embodying cooperating coupling members connected to the spring-actuated shifting means and the operating means and shiftably coupled with each other for limited movement with respect to each other to permit in predetermined positions of the coupling members independent individual operation of the operating means and individual actuation of the shutter means by the spring-actuated shifting means.

2. In a material spreader having a hopper with discharge openings and shiftable shutter means controlling the discharge openings, a handlebar unit attached to the hopper embodying an elongated body of U-shaped cross section having a cross wall near one end thereof and an adjustable stop member supported by said elongated body between its opposite ends, and spring-actuated shifting means for the shiftable shutter means including an elongated member extended through said cross wall of the elongated body and said adjustable stop member and a compression spring sleeved upon the elongated member and seated against one end of the said cross wall of the elongated body, said elongated member of the spring-actuated shifting means including two spaced means, one of which engages the other end of the compression spring and the other one of which cooperates with the adjustable stop member in arresting shifting of the elongated member when in a predetermined position.

3. In a material spreader, a wheel-supported hopper, a handlebar assembly attached to the hopper, shiftable shutter means controlling discharge of material from the hopper, spring-actuated shifting means coupled with the shiftable shutter means including spring means adapted to automatically shift the shutter means to open position, operating means for the spring-actuated shifting means rotatably supported on the handlebar unit and a coupling connection between the operating means and the spring-actuated shifting means, said coupling connection including cooperating coupling members one of which is secured to the spring-actuated shifting means and another one of which is secured to the operating means, and cooperating coupling members being shiftably coupled to each other for predetermined limited movement with respect to each other to permit in predetermined positions of the coupling members individual shifting of the shutter means by the spring-actuated shifting means and individual shifting of the operating means without actuating the shutter means.

4. A material spreader as described in claim 3, wherein the one coupling member of the coupling connection consists of a shaft rotatably mounted on the handlebar assembly, and wherein the other coupling member consists of a sleeve having a radial slot in its peripheral wall, said sleeve being rotatably mounted on said shaft and shiftably coupled therewith by the pin of the shaft extended into the radial slot of the sleeve, and said sleeve including a lever arm connected to the spring-actuated shifting means.

References Cited in the file of this patent
UNITED STATES PATENTS

| | | |
|---|---|---|
| 2,710,116 | Juzwiak | June 7, 1955 |
| 2,718,986 | Peoples | Sept. 27, 1955 |
| 2,735,582 | Wilson | Feb. 21, 1956 |